United States Patent
Yamada et al.

(10) Patent No.: US 9,304,917 B2
(45) Date of Patent: Apr. 5, 2016

(54) FLUSH CONTROL APPARATUS, FLUSH CONTROL METHOD AND CACHE MEMORY APPARATUS

(71) Applicant: NEC Corporation, Tokyo (JP)

(72) Inventors: Yohei Yamada, Tokyo (JP); Yasuo Ishii, Tokyo (JP)

(73) Assignee: NEC Corporation, Tokyo (JP)

(*) Notice: Subject to any disclaimer, the term of this patent is extended or adjusted under 35 U.S.C. 154(b) by 169 days.

(21) Appl. No.: 14/167,485

(22) Filed: Jan. 29, 2014

(65) Prior Publication Data

US 2014/0223102 A1 Aug. 7, 2014

(30) Foreign Application Priority Data

Feb. 5, 2013 (JP) .................................. 2013-019992

(51) Int. Cl.
*G06F 12/08* (2006.01)

(52) U.S. Cl.
CPC ........ *G06F 12/0808* (2013.01); *G06F 12/0804* (2013.01); *G06F 12/0864* (2013.01); *G06F 2212/301* (2013.01)

(58) Field of Classification Search
CPC ............ G06F 12/0864; G06F 12/0846; G06F 12/0808
USPC ........................................................ 711/128
See application file for complete search history.

(56) References Cited

U.S. PATENT DOCUMENTS

| 2012/0246410 A1* | 9/2012 | Xu ........................ G06F 12/126 711/128 |
| 2013/0036270 A1* | 2/2013 | Dreslinski ........... G06F 12/0893 711/128 |

FOREIGN PATENT DOCUMENTS

| JP | 04-181343 A | 6/1992 |
| JP | 05-066996 A | 3/1993 |
| JP | 06-035953 A | 2/1994 |
| JP | 2001-202286 A | 7/2001 |
| JP | 2002-063154 A | 2/2002 |
| JP | 2004-013868 A | 1/2004 |
| JP | 3757768 B2 | 3/2006 |
| JP | 2010-140306 A | 6/2010 |

OTHER PUBLICATIONS

Nicolaescu et al. (Using a Way Cache to Improve Performance of Set-Associative Caches, Department of Computer Science, University of Irvine, ISHPC 2005 and ALPS 2006, LNCS 4759, pp. 93-104, 2008).*

* cited by examiner

*Primary Examiner* — Adam M Queler
*Assistant Examiner* — Edmund Kwong
(74) *Attorney, Agent, or Firm* — Wilmer Cutler Pickering Hale and Dorr LLP (57) ABSTRACT

A flush control apparatus controls a Set Associative cache memory apparatus. A flush control apparatus includes: a tag memory unit associating a tag identifier identifying a tag which associates a plurality of cache lines and tag information representing whether or not the tag is valid. It also includes a line memory unit, a way specification unit and a flush unit which flushes the way specified by the way specification unit.

10 Claims, 10 Drawing Sheets

FLUSH CONTROL APPARATUS, FLUSH CONTROL METHOD AND CACHE MEMORY APPARATUS

This application is based upon and claims the benefit of priority from Japanese Patent Application No. 2013-019992 filed on Feb. 5, 2013, the disclosure of which is incorporated herein in its entirety by reference.

TECHNICAL FIELD

The present invention relates to a flush control apparatus and a cache memory apparatus etc. which make high-speed processing possible.

BACKGROUND ART

As methods to realize the cache memory apparatus, there are Direct Mapped, Fully Associative, Set Associative etc. In a computer system in which, while a plurality of processors sharing a main memory (main memory apparatus), all or a part of processors have a cache memory apparatus respectively, it is necessary to pay attention to coherency of data between the cache memory apparatus and the main memory.

In order to keep the coherency of data, there are: a technique in which hardware performs control of maintaining data coherency in the cache memory apparatus and the main memory, a technique in which software controls access destination addresses and operation of the cache memory apparatus explicitly, a technique in which hardware and software control operation of the cache memory apparatus in a coordinated manner, etc. By the techniques mentioned above, in particular, by the technique in which hardware controls coherency, a user can program without being conscious of the hardware.

Figure 11:
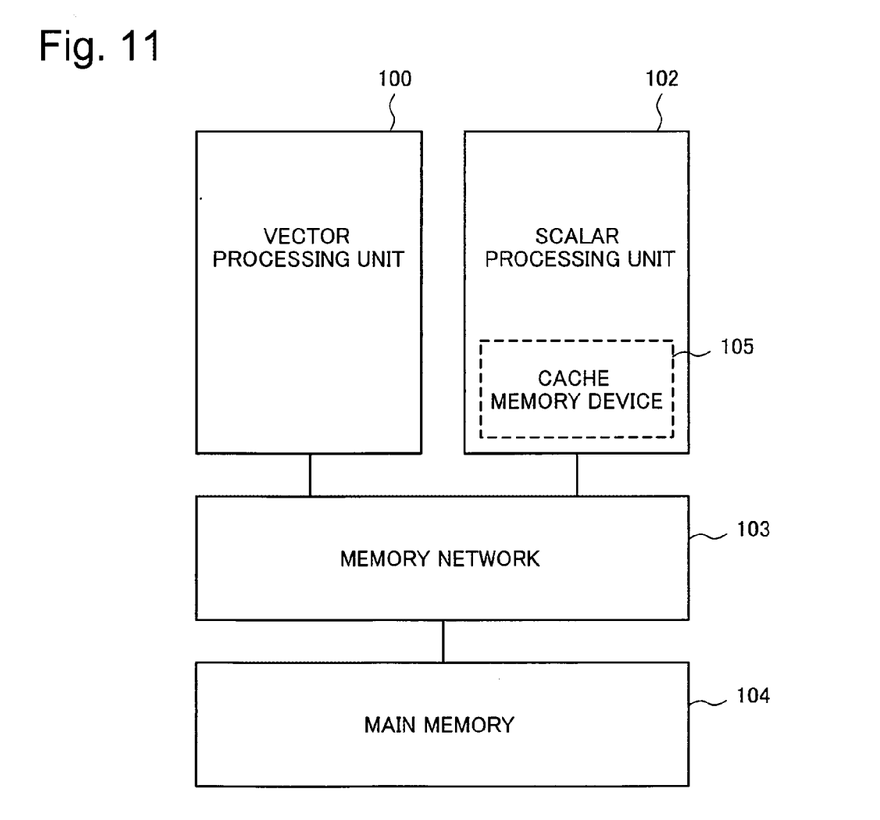
FIG. 11 is a block diagram illustrating a structure which a general vector processor includes.

For example, in case a vector processor possessing a structure as shown in FIG. 11 processes a vector store instruction, it is necessary that data in a cache memory apparatus 105 of a scalar processor is consistent with data in a main memory 104. FIG. 11 is a block diagram illustrating a structure which a general vector processor includes.

The vector processor includes a vector processing unit 100, a scalar processing unit 102, a memory network 103 and the main memory 104.

The scalar processing unit 102 performs processing such as: instruction fetch to read an instruction from the main memory 104, decode to interpret the instruction, scheduling to decide a sequence to execute the decoded instructions and instruction execution to execute the instructions in accordance with the sequence. Further, the scalar processing unit 102 directs to the vector processing unit 100 a load instruction to read data from the main memory 104, a store instruction to write data to the main memory 104 and a vector operation instruction etc.

The vector processing unit 100 includes a vector register which holds vector data and an arithmetic unit etc. which process the store instruction and the load instruction etc. respectively. In accordance with the instructions which the scalar processing unit 102 directs, the vector processing unit 100 sends and receives data stored to main memory 104 via the memory network 103.

The memory network 103 transmits data between the scalar processing unit 102 and the vector processing unit 100, and the main memory 104.

The scalar processing unit 102 includes the cache memory apparatus 105 which reduces an overhead of reading data from the main memory 104.

Figure 12:
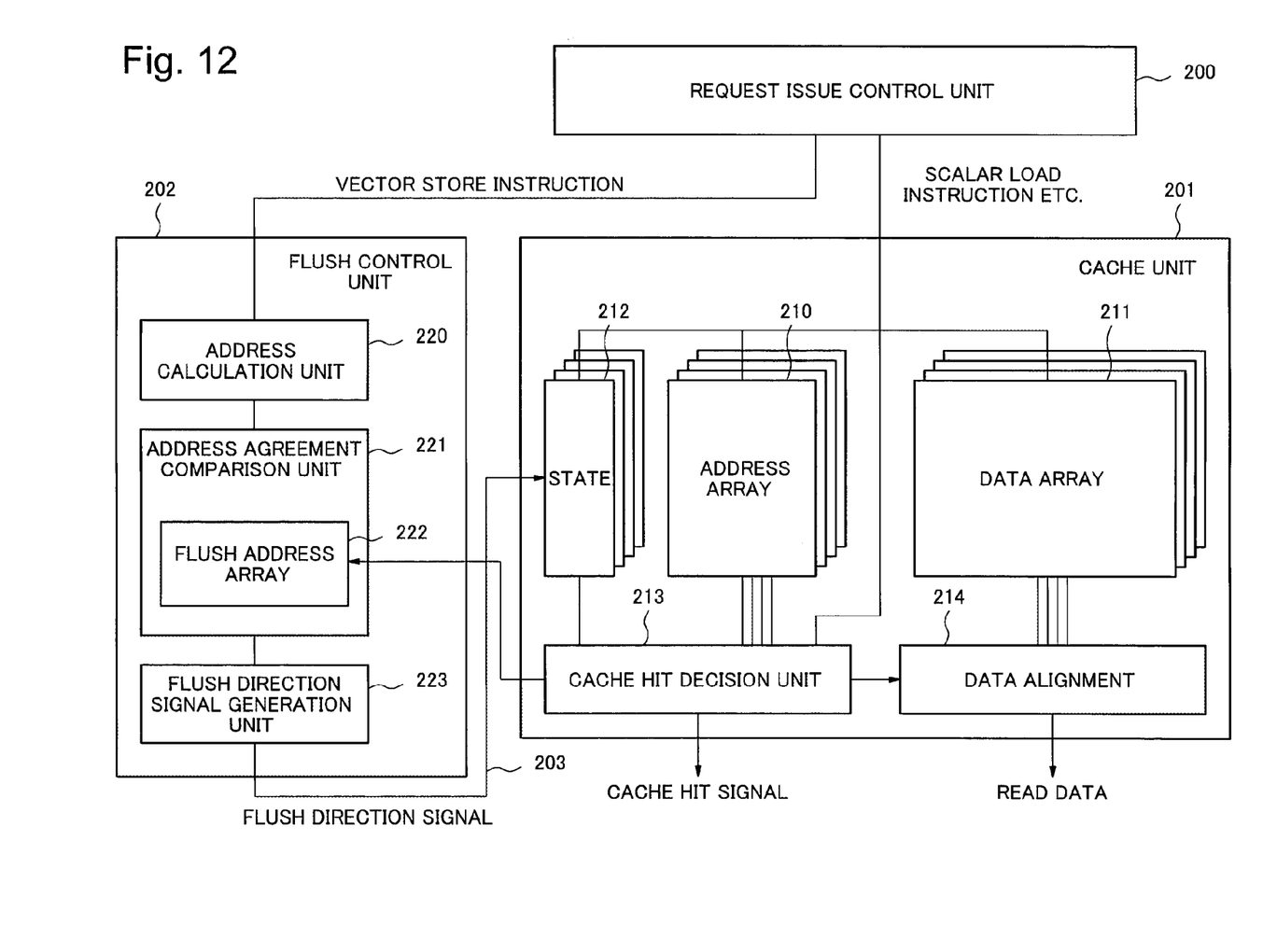
FIG. 12 is a block diagram illustrating a structure which a general cache memory apparatus includes in a vector processor.

The cache memory apparatus 105 will be explained with reference to FIG. 12. FIG. 12 is a block diagram illustrating a structure of general cache memory apparatus 105 in the vector processor. The cache memory apparatus 105 includes a request issue control unit 200, a flush control unit 202 and a cache unit 201.

The request issue control unit 200, for example, decides a sequence to executes instructions such as a scalar load instruction to read an element from the main memory 104 into the scalar processing unit 102 and a vector store instruction to write a plurality of elements from the vector processing unit 100 into the main memory 104, and issues the instructions according to the sequence.

The cache unit 201 includes an address array 210, a data array 211, a cache hit decision unit 213, and data alignment 214. In the explanation below, it is assumed for convenience of explanation that the cache unit 201 is a write through cache memory apparatus realized by four-way Set Associative.

The data array 211 has the capability to store a copy of data stored in the main memory 104 by units of cache lines. The address array 210 has the capability to store an address of a region storing an original data stored in the data array 211. The address stored in the address array 210 is associated with the data stored in the data array 211. The address array 210 has the capability to associate the address of the data stored in the data array 211 and valid information representing whether or not the address is valid and store them. In case the address is valid, the data array 211 associated with the address stores the data at the address on the main memory 104.

The cache unit 201 decides, by referring to the address array 210 for the instruction which the request issue control unit 200 issues, whether or not the data array 211 stores the data at the address which the instruction accesses.

In a situation to execute a scalar load instruction, in case the data array 211 stores the data at the address which the instruction accesses, the cache unit 201 reads the data from the data array 211 and outputs the data read as read data. In case the data array 211 does not store the data at the address which the instruction accesses, the cache unit 201 performs read processing to read data from the main memory 104 into the data array 211.

In a situation to execute a scalar store instruction, in case the data array 211 stores the data at the address accessed by the instruction, the cache unit 201 stores the data into the data array 211.

The flush control unit 202 includes an address calculation unit 220, a flush address array 222 in an address comparison unit 221 and a flush direction signal generation unit 223.

The flush address array 222 has the capability to store a copy of the address data stored in the address array 210.

The address calculation unit 220 calculates an address to store data in accordance with the vector store instruction which the request issue control unit 200 sends, and sends the calculated address to the address comparison unit 221.

Next, the address comparison unit 221 receives the address and compares the received address and the address stored in the flush address array 222.

In case the address which the address comparison unit 221 received is the same with the address stored in the flush address array 222, the flush direction signal generation unit 223 send a signal to invalidate (to flush) a cache line associated with the address received (hereinafter, shown as "a flush direction signal 203") to the cache unit 201. In response to receiving the flush direction signal 203, the cache unit 201 invalidates the cache line by writing valid information representing invalid in a state 212.

On the other hand, in case the data array 211 stores a new cache line, and in case of invalidating a certain cache line, the cache unit 201 sends information about the cache line to be changed to the flush control unit 202.

By the flush direction signal generation unit 223 sending the flush direction signal 203 to the cache unit 201 in accordance with the vector store instruction to write data into the main memory, coherency of data is kept.

PTL 1 to PTL 3 disclose technologies which control coherency between data in the cache memory apparatus 105 and data in the main memory 104.

PTL 1 discloses a cache memory apparatus etc. which, in a computer system including a scalar processor and a vector processor, reduces performance degradation caused by processing to maintain coherency of data.

The cache memory apparatus which PTL 1 discloses includes, in order to carry out flush processing, a flush address array which is a copy of an address array. The cache memory apparatus compares whether or not an address stored in the flush address array matches an address referred to in a vector store instruction. In case these addresses match, the cache memory apparatus sends a signal to direct flush.

PTL 2 discloses a cache memory apparatus which processes valid information representing whether or not a flush address array is valid at high speed.

In order to process at high speed, the cache memory apparatus disclosed in PTL 2 stores the valid information mentioned above and includes a memory means capable to carry out read process and write process in 1 machine cycle.

PTL 3 discloses a cache memory control system which has the capability to reduce a required hardware volume of an address array.

In the cache memory control system which PTL 3 discloses, flush processing is performed in units of blocks which gathered a plurality of cache lines. That is, in accordance with update processing of data stored in a main memory, all cache lines in a block containing a cache line possessing a copy of data of the main memory updated by the update processing are flushed.

CITATION LIST

Patent Literature

[PTL 1] Japanese Patent Publication No. 3757768
[PTL 2] Japanese Unexamined Patent Application Publication No. 1992 (H 04)-181343
[PTL 3] Japanese Unexamined Patent Application Publication No. 1993 (H 05)-066996

SUMMARY OF INVENTION

Technical Problem

However, in the cache memory apparatus which PTL 1 and PLT 2 disclose, in order to realize high-speed processing, it is necessary to raise a degree of parallelism of the processing to compare the address arrays, and therefore, to increase the number of duplicated flush address array or read ports. As a result, there is a problem in the technologies described in PTLs 1 and 2 that, with an increase of the degree of parallelism, circuit volume of the cache memory apparatus increases.

Also, the cache memory apparatus which PTL 3 discloses, since it performs processing in units of the block unit which gathered a plurality of address arrays, has the capability to flush a plurality of cache lines at one time. However, since the cache memory apparatus does not have the capability to control a way which is indispensable in Set Associative, there is a problem that it cannot be applied to Set Associative.

One object of the present invention is to provide a flush control apparatus etc. which controls a Set Associative cache memory apparatus efficiently.

SUMMARY

In order to achieve the object mentioned above, the flush control apparatus according to the present invention is characterized by including the following structure.

That is, the flush control apparatus according to the present invention is characterized by including:

a line memory unit configured to store information which associates line information representing whether or not a first cache line in the plurality of cache lines associated with the tag is valid and a way information identifying a location storing the first cache line in accordance with a predetermined format;

a way specification unit configured to calculate a first tag identifier and a first address identifying the cache line including the address(es) respectively from one or more addresses for flushing and in accordance with a predetermined calculation method and search a specific tag identifier matching the first tag identifier in the tag memory unit, in case the specific tag identifier is found, read whether or not the tag information associated with the specific tag identifier indicates valid, in case the tag information stored in the tag memory unit indicates valid, read the line information associated with a plurality of second cache lines at an entry of the specific tag and the way information at an entry of the specific tag identifier respectively, and among the plurality of second cache lines, search a specific cache line, of which the line information indicates valid, contained in the first address, and send way information identifying the specific way storing the specific cache line; and a flush unit configured to receive the way information identifying the specific way and direct to flush the specific way among the ways storing the specific cache line.

Also, as another aspect of the present invention, a flush control method according to the present invention is characterized by:

calculating a first tag identifier and a first address identifying the cache line including the address(es) respectively from one or more addresses for flushing and in accordance with a predetermined calculation method and searching a specific tag identifier matching the first tag identifier in the tag memory unit, in case the specific tag identifier is found, reading whether or not the tag information associated with the specific tag identifier indicates valid, in case the tag information stored in the tag memory unit indicates valid, reading the line information associated with a plurality of second cache lines at an entry of the specific tag and the way information at an entry of the specific tag identifier respectively, and among the plurality of second cache lines, searching a specific cache line, of which the line information indicates valid, contained in the first address, and send way information identifying the specific way storing the specific cache line, and receiving the way information identifying the specific way and direct to flush the specific way among the ways storing the specific cache line.

According to the flush control apparatus etc. according to the present invention, the Set Associative cache memory apparatus having the capability to be controlled efficiently.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, exemplary embodiments which carry out the present invention will be explained in detail with reference to drawings.

First Exemplary Embodiment

Figure 1:
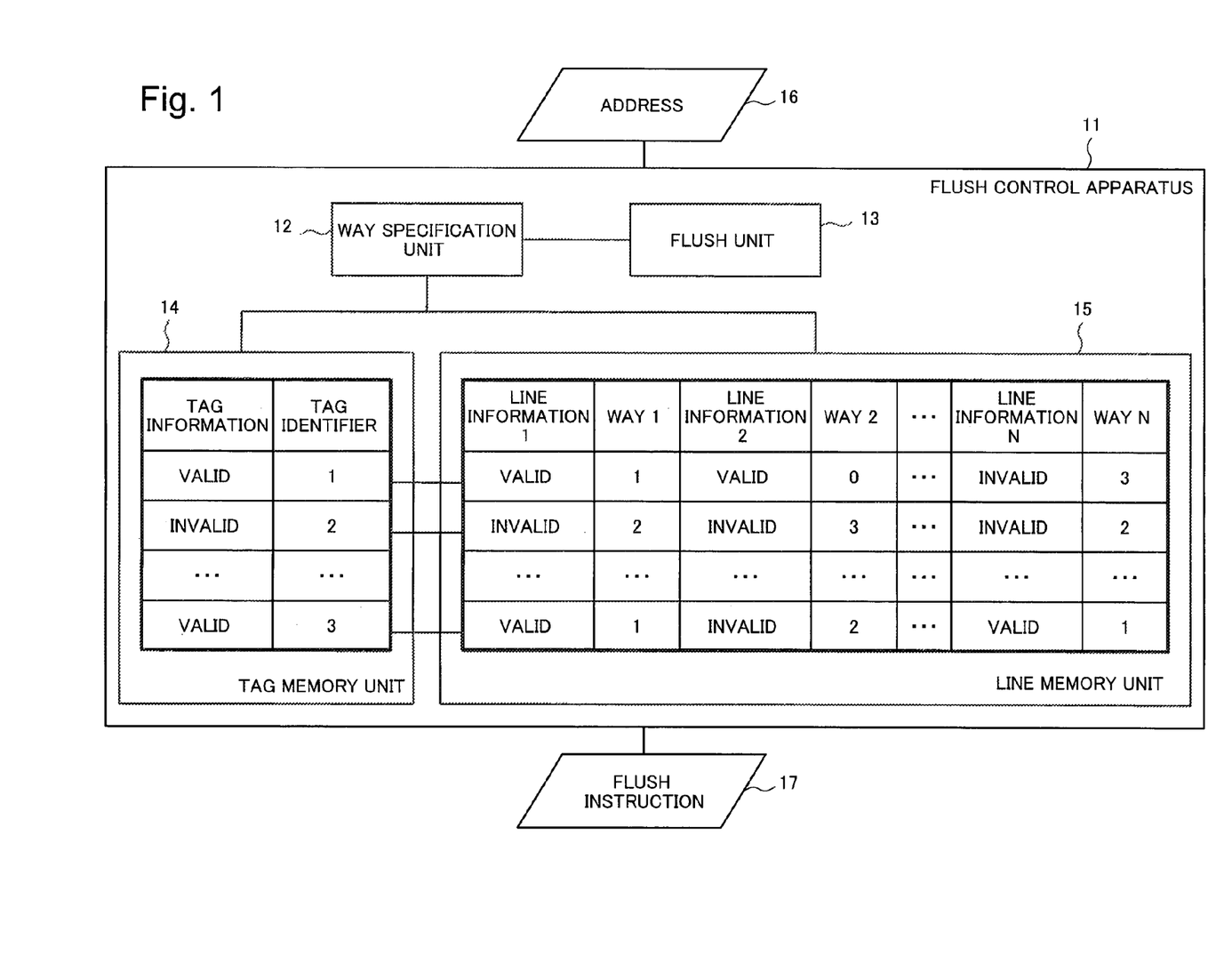
FIG. 1 is a block diagram showing a structure which a flush control apparatus according to a first exemplary embodiment of the present invention includes.
Figure 2:
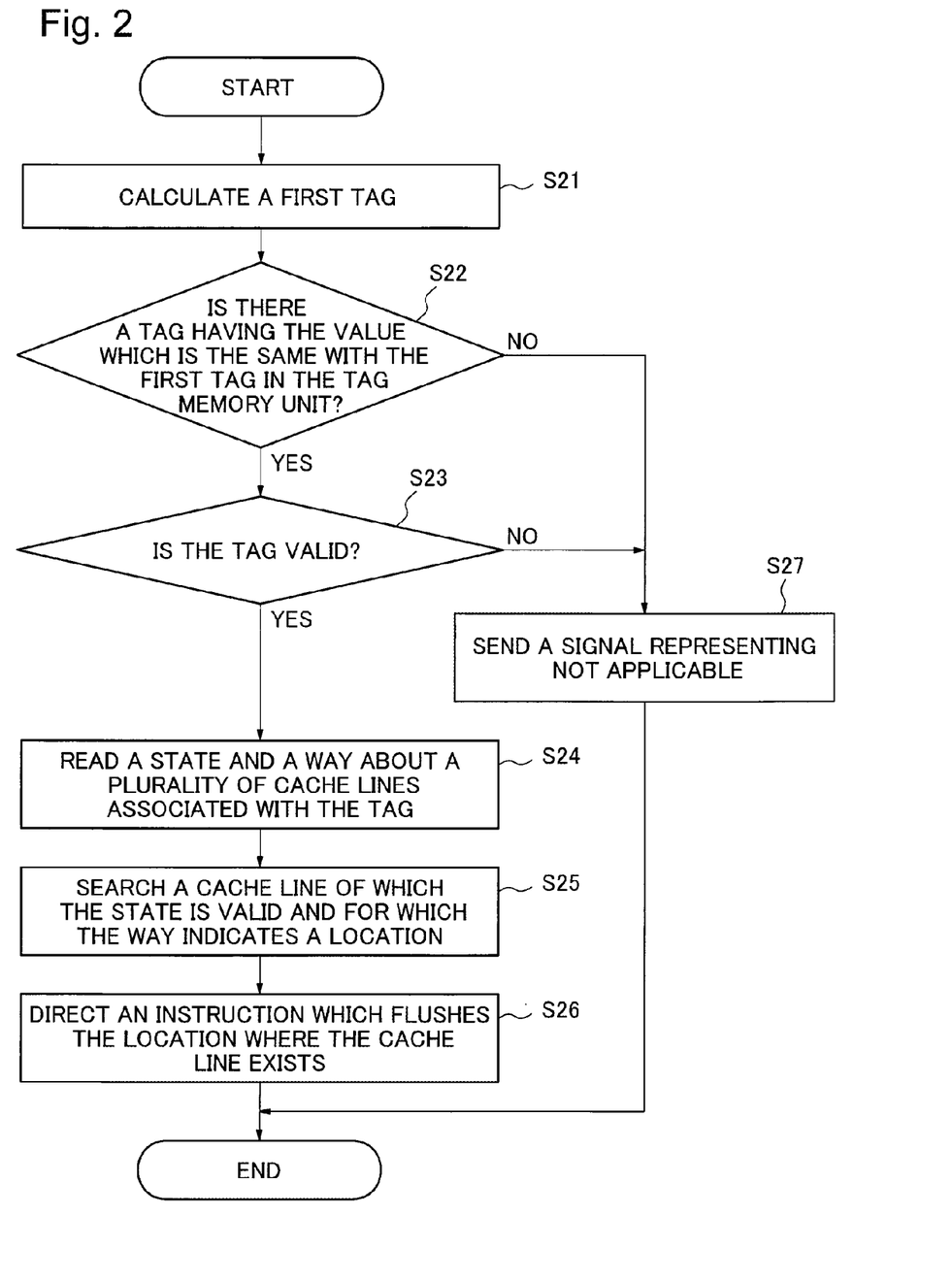
FIG. 2 is a flow chart showing a flow of processing in a flush control apparatus according to the first exemplary embodiment.

A structure which a flush control apparatus 11 according to a first exemplary embodiment of the present invention includes and processing performed by the flush control apparatus 11 will be explained in detail with reference to FIGS. 1 and 2. FIG. 1 is a block diagram showing a structure which the flush control apparatus 11 according to the first exemplary embodiment of the present invention includes. FIG. 2 is a flow chart showing a flow of processing in the flush control apparatus 11 according to the first exemplary embodiment.

The flush control apparatus 11 according to the first exemplary embodiment includes a way specification unit 12, a flush unit 13, a tag memory unit 14 and a line memory unit 15.

The tag memory unit 14 has the capability to associate a tag identifier which identifies a tag associated with a plurality of cache lines and tag information which shows whether or not the tag identifier is valid, and store them.

The line memory unit 15 has the capability to associate line information which shows whether or not a cache line is valid in a data array (not shown, for example, refer to FIG. 12) and in case the line information is valid, information about a way (hereinafter shown as "way information") which indicates an area in the data array, and store them. The line memory unit 15 associates information about a plurality of cache lines associated with a tag to an area in the tag memory unit 14 storing the tag identifier representing the tag and store them.

The line memory unit 15 stores information representing a state of a cache line associated with a tag in accordance with a predetermined format. For example, the predetermined format is such as; a format which arranges in ascending order of addresses which identify a cache line, a format which arranges in descending order of addresses, or a format which holds line information and a way information in a form they are encoded all together.

Also, as an example of the form for encoding, there is a form which, for a cache memory apparatus which adopts Set Associative of three ways, for example, expresses the line information and the way as one number using 2 bits.

By identifying the way using 2 bits, it is possible to designate four ways. On the other hand, the cache memory apparatus in the example mentioned above includes only three ways. In case a value expressed by 2 bits indicates the way which does not exist in the cache memory apparatus, it is assumed that the value represents "a state that line information is invalid".

For example, it is a form assuming that: in case the value after encoding is 2b11 ("2b" shows that it is 2 bits in case expressed in bits and it is transcribed based on a binary notation), it represents that the line information is invalid, and in case of other values, it represents that the line information is valid and the value of 2 bits after encoding is the way.

Although it has been explained using an example of the cache memory apparatus possessing three ways and the line information possessing 2 bits, the predetermined format is not limited to the example mentioned above.

It is assumed that an entry shows an area where an area in the tag memory unit 14 and an area in the line memory unit 15 are associated. That is, "an entry of a specific tag in the line memory unit 15" shows an area in the line memory unit 15 which is associated with an area where the tag identifier is the specific tag in the tag memory unit 14.

For example, in an example shown in FIG. 1, the tag memory unit 14 has the capability to associate a first tag of which a tag identifier is 1 and tag information which shows that the first tag is valid, and store them (second line in the tag memory unit 14). Further, the line memory unit 15 has the capability to, for a plurality of cache lines associated with the first tag, associate line information about the respective cache lines and way information, and store them (second line in the line memory unit 15). In this case, the entry shows the second line in the tag memory unit 14 and the second line in the line memory unit 15.

That is, in the example shown in FIG. 1, for example, a memory area of N-th line (N is a positive integer. For example, N is 1, 2, . . . ) in the tag memory unit 14 is associated with a memory area of N-th line in the line memory unit 15. In this case, N-th entry shows the N-th line in the tag memory unit 14 and the N-th line in the line memory unit 15. In order to explain in a simpler way, in the explanation of this exemplary embodiment, it is supposed that association is made as mentioned above. However, this exemplary embodiment is not limited to the example mentioned above.

Further, in order to explain concisely, this exemplary embodiment will be explained with reference to a following example.

An address in the main memory is in units of 1 byte and is transcribed in 48 bits.

Size of each cache line is 256 bytes. That is, each cache line is capable of storing 256 elements of which addresses succeed in the main memory.

An address of the cache line is identified by 40 bits of higher order out of 48 bits representing the address in the main memory (40=48 bits−8 bits (correspond to 256 of data in the cache line)) and is transcribed in 48 bits with lower order 8 bits of the address being made 0.

A tag identifier is 32 bits of higher order out of 48 bits representing the address of the cache line. That is, each tag is associated with 256 cache lines having a common tag identifier.

The cache memory apparatus adopts four-way Set Associative.

Although this exemplary embodiment is explained using the example as above, this exemplary embodiment is not limited to the example mentioned above. It is also similar in each exemplary embodiment of the present invention.

Figure 3:
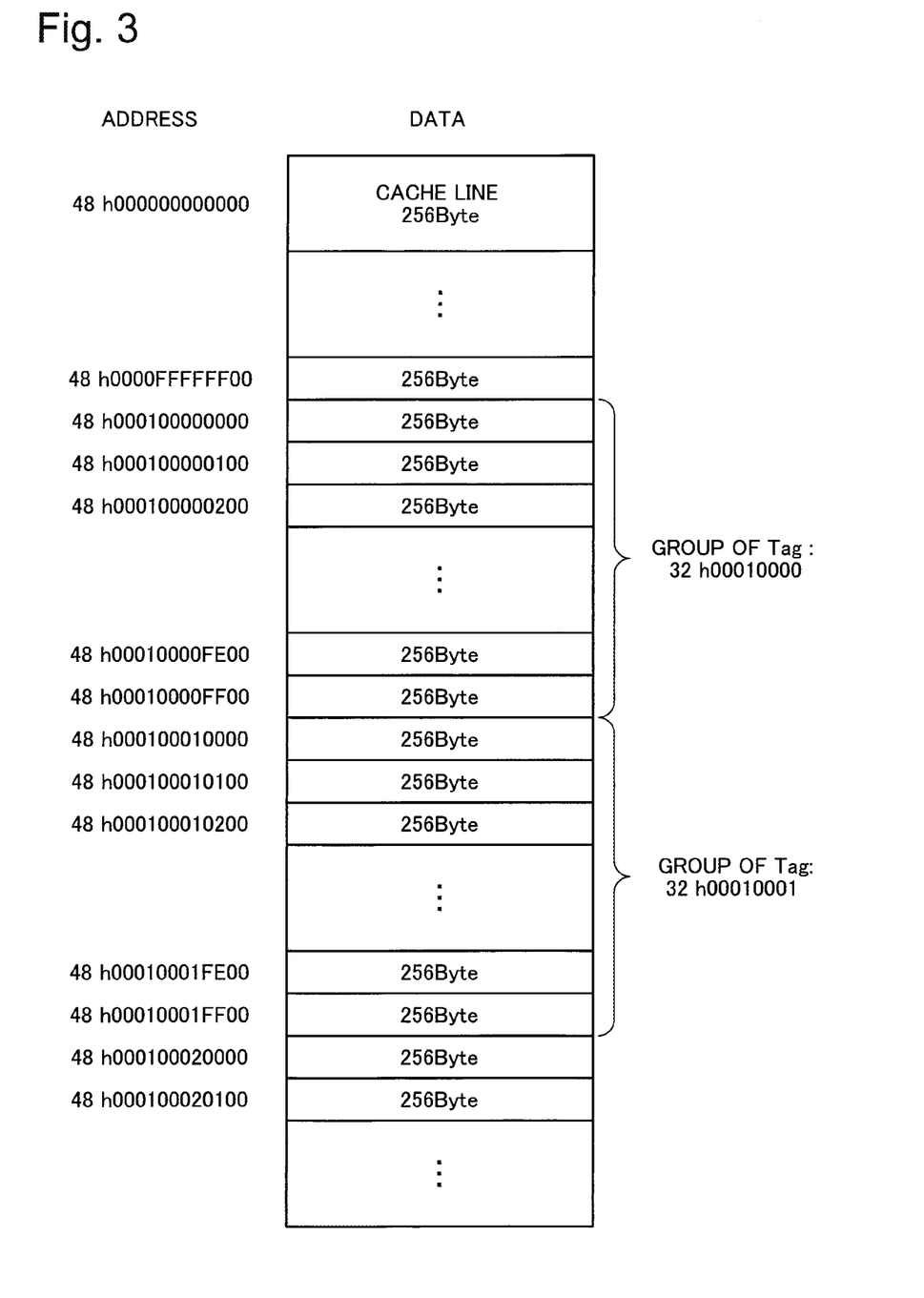
FIG. 3 is a figure illustrating conceptually an example of a tag and a cache line.

The tag and the cache line will be explained with reference to an example which FIG. 3 shows. FIG. 3 is a figure illustrating an example of the tag and the cache line conceptually. For example, the cache line of "address 48h000100000000" ("48h" shows that it is 48 bits in case expressed in bits and, it is transcribed based on hexadecimal notation) is associated with data whose address in the main memory is between "48h000100000000" and "48h0001000000FF".

Further, "tag 32h00010000" ("32h" shows that it is 32 bits in case expressed in bits and it is transcribed based on hexadecimal notation) is associated with the cache lines between "address 48h000100000000" and "address 48h00010000FF00". For example, the line memory unit 15 associates to an entry of "tag 32h00010000" line information about the respective cache lines between "address 48h000100000000" and "address 48h00010000FF00" and ways in accordance with a predetermined format, and stores them.

Figure 4:
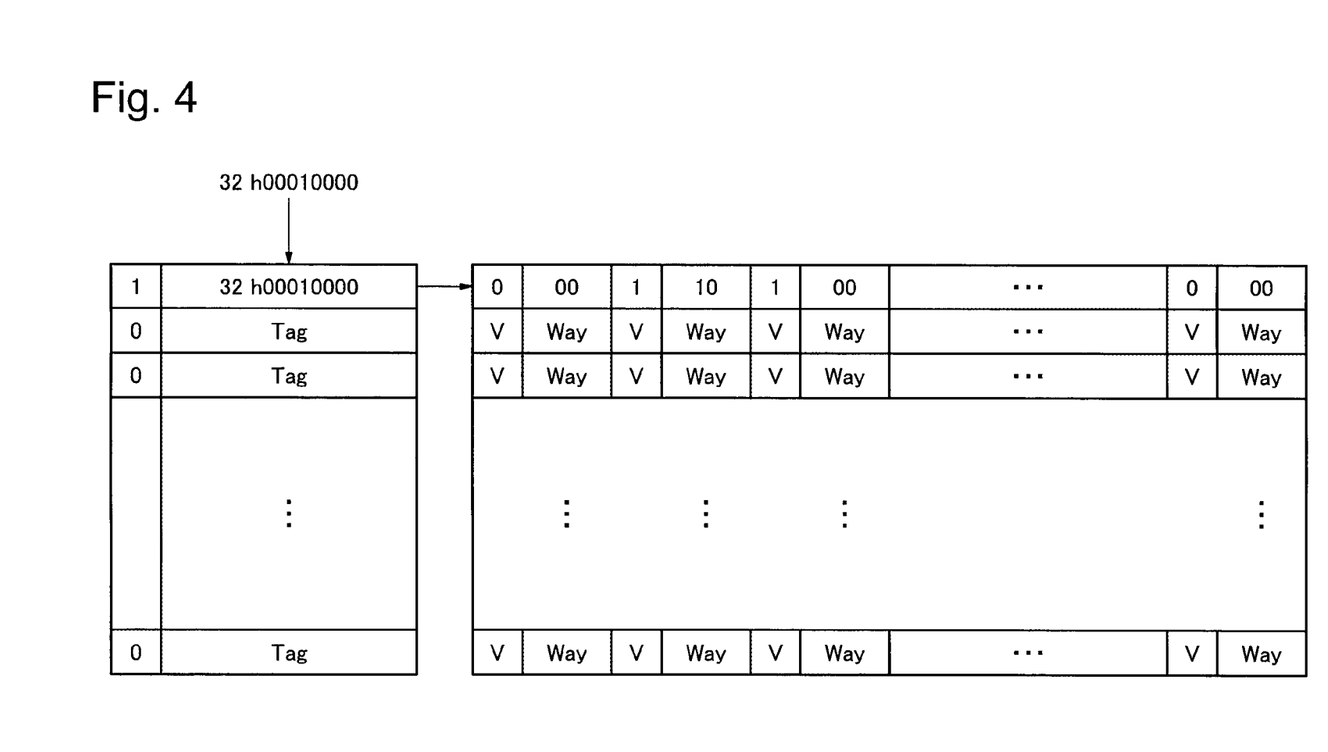
FIG. 4 is a figure illustrating conceptually an example of data capable of storing in a tag memory unit and a line memory unit according to the first exemplary embodiment.

Further, the line information, the way information, the tag information etc. will be explained in detail with reference to FIG. 4. FIG. 4 is a figure illustrating conceptually an example of data which has the capability to store the tag memory unit 14 and the line memory unit 15 according to the first exemplary embodiment.

For example, in an example shown in FIG. 4, the tag memory unit 14 associates "tag 32h00010000" and "tag information 1" representing that the tag is valid, and stores them. The line memory unit 15 associates to the entry of "tag 32h00010000" line information about the cache lines between "address 48h000100000000" and "address 48h00010000FF00" and way information about a way in accordance with a predetermined format, and stores them. For example, in case the predetermined format is a format which arranges in ascending order of addresses of the cache line, the line memory unit 15 stores the way information and the line information associated with the cache line of "address 48h000100000N00" (N is a hexadecimal number of 1 digit) in an area corresponding to N-th from the left.

In the example shown in FIG. 4, since the cache line of "address 48h000100000000" is associated with "line information 0", the cache memory apparatus does not store the cache line. Since the cache line of "address 48h000100000100" is associated with "line information 1" and "way 2" (that is, "10" in binary number), the cache memory apparatus stores data in the cache line in "way 2". Similarly, since the cache line of "address 48h000100000200" is associated with "line information 1" and "way 0" (that is, "00" in binary number), the cache memory apparatus stores data in the cache line in "way 0".

Next, a flow of processing in the cache flush equipment shown in FIG. 1 will be explained with reference to FIG. 2. First, the way specification unit 12 received a plurality of addresses 16. The specification unit 12 calculates an address of a cache line containing one of the addresses 16 and calculates a tag identifier associated with the cache line according to a predetermined calculation method. The specification unit 12 calculates the each of the addresses and each of the tag identifiers from a plurality of addresses 16 according to a predetermined calculation method (Step S21). For example, as the predetermined calculation method, there is a method such as to calculate the address of the cache line and the tag identifier associated with the cache line from higher order bits of the address 16.

For example, it is assumed that the way specification unit 12 received "address 48h000100000008", "address 48h000100000108" and "address 48h000100000208". In that case, the way specification unit 12 calculates "address 48h000100000000" which is the address of the cache line and "tag 32h00010000" from "address 48h000100000008".

Similarly, the way specification unit 12 calculates "address 48h000100000100" which is the address of the cache line and "tag 32h00010000" from "address 48h000100000108". Further, the way specification unit 12 calculates "address 48h000100000200" which is the address of the cache line and "tag 32h00010000" from "address 48h000100000208".

In the example mentioned above, the cache lines containing the received addresses are different from each other. However, the tags containing the cache lines are common in either address mentioned above.

Next, in the tag memory unit 14, the way specification unit 12 searches a tag identifier which is the same with the calculated tag identifier (Step S22). In case the same tag identifier exists (decided YES in Step S22), the way specification unit 12 reads tag information associated with the tag identifier from the tag memory unit 14, and decides whether or not the tag information is valid (Step S23). In case the same tag identifier does not exist (decided NO in Step S22), and in case the tag information is not valid (decided NO in Step S23), the flush unit 13 sends a signal representing "not applicable" (Step S27). In case the tag information is valid (decided YES in Step S23), the way specification unit 12 reads line information and way information about a plurality of cache lines at one time from the entry of the tag in the line memory unit 15 (Step S24).

Next, in case it is decided that read line information is valid and read way information represents a specific way (i.e. the read way information identifies a way included in a set associative cache memory as explained above by referring to the example of three-ways set associative cache memory apparatus), the way specification unit 12 sends the way information to the flush unit 13 (Step S25).

The flush unit 13 directs, in the received way information, a flush instruction 17 which flushes an area of the data array corresponding to the address which is calculated from the received addresses to the cache memory apparatus (Step S26).

For example, in the example which FIG. 4 shows, the way specification unit 12 searches "tag 32h00010000" from the tag memory unit 14 and reads "tag information 1" associated with the tag identifier. That is, the way specification unit 12 decides that "tag 32h00010000" is valid.

Next, the way specification unit 12 reads from the line memory unit 15 line information and a way information which are associated with cache lines between "address 48h000100000000" and "address 48h00010000FF00" associated with "tag 32h00010000" respectively.

For example, the way specification unit 12 reads that the cache line of "address 48h000100000100" is valid in "way 2", that the cache line of "address 48h000100000200" is valid in "way 0" etc., and sends read information about ways to the flush unit 13.

Next, in response to receiving the way information, the flush unit 13 directs the instruction which flushes, among the area of the data array capable of storing the cache line of "address 48h000100000100", "way 2" to the cache memory apparatus. As well, the flush unit 13 directs the instruction which flushes, among the area of the data array capable of storing the cache line of "address 48h000100000200", "way 0" to the cache memory apparatus.

The apparatus described in PTLs 1 to 3 does not have the capability to control the cache memory apparatus which adopt Set Associative at high speed. The reason is, in the cache memory apparatus which adopt Set Associative, since a plurality of ways capable of storing the cache lines exists, ways to flush does not have the capability to be designated.

On the other hand, according to this exemplary embodiment, since the line memory unit 15 associates way information about the ways which store the cache line and stores them, it is possible to specify the way storing the cache line to flush.

That is, according to the flush control apparatus according to the first exemplary embodiment, cache memory of Set Associative is capable of being controlled efficiently.

Second Exemplary Embodiment

Next, a second exemplary embodiment on the basis of the first exemplary embodiment mentioned above will be explained In the following explanation, a characteristic part according to this exemplary embodiment will be explained mainly, and similar structures as the first exemplary embodiment mentioned above are attached the identical reference numbers and overlapping explanation will be omitted.

Figure 5:
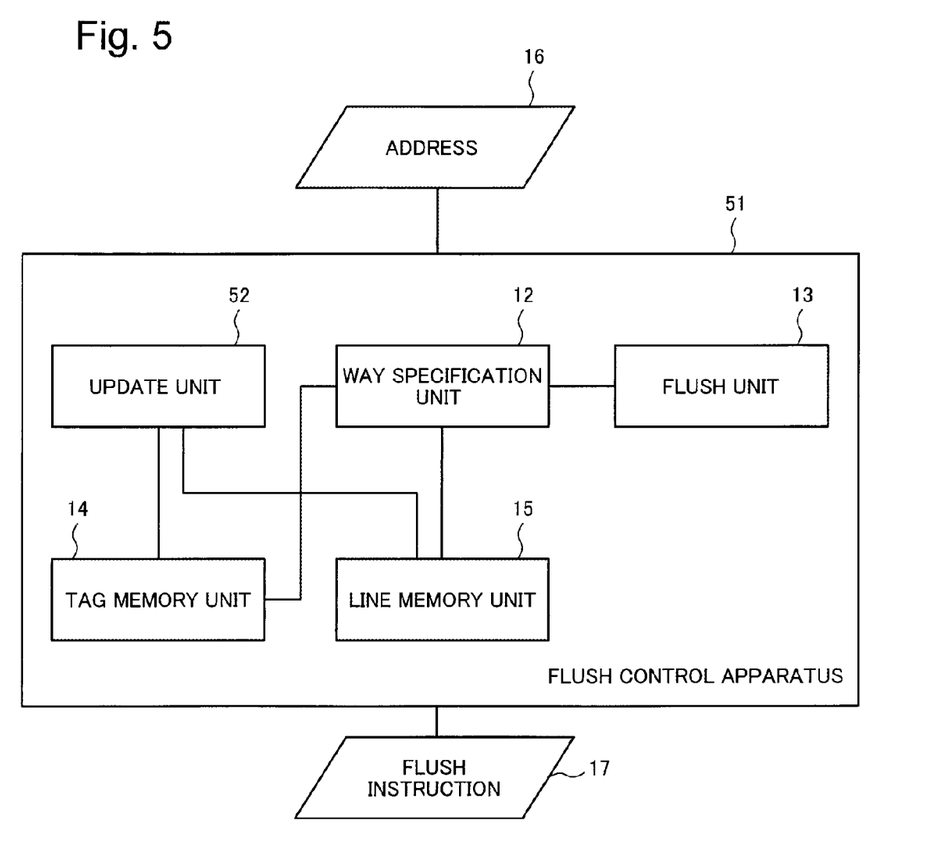
FIG. 5 is a block diagram showing a structure which a flush control apparatus according to a second exemplary embodiment of the present invention includes.
Figure 6:
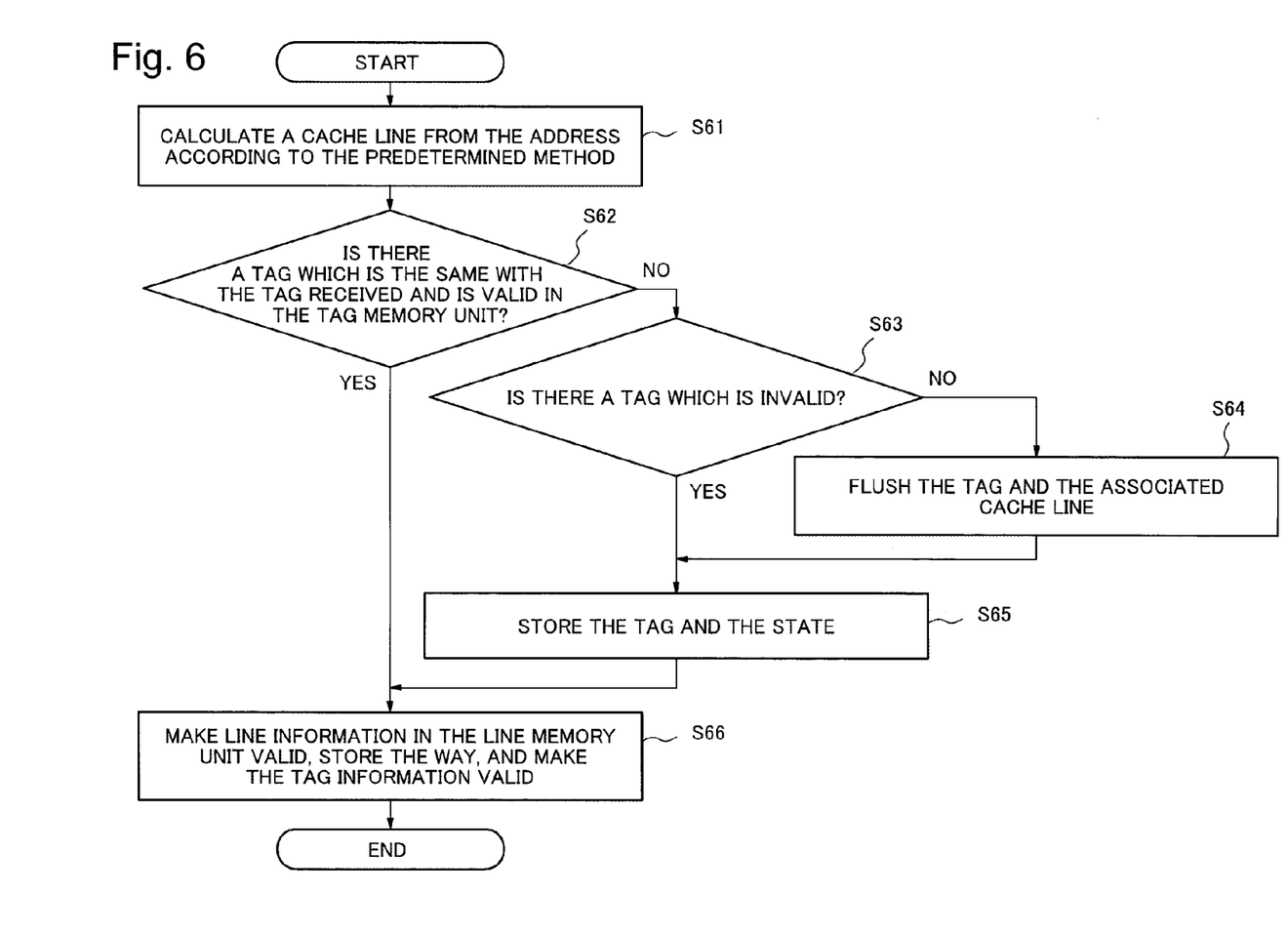
FIG. 6 is a flow chart showing a flow of processing in a flush control apparatus according to the second exemplary embodiment.

A structure which a flush control apparatus 51 according to the second exemplary embodiment of the present invention includes and processing performed by the flush control apparatus 51 will be explained with reference to FIGS. 5 and 6. FIG. 5 is a block diagram showing a structure which the flush control apparatus 51 according to the second exemplary embodiment of the present invention includes. FIG. 6 is a flow chart showing a flow of processing in the flush control apparatus 51 according to the second exemplary embodiment.

The flush control apparatus 51 according to this exemplary embodiment includes further, in addition to the first exemplary embodiment, an update unit 52 which updates data in the tag memory unit 14 and the line memory unit 15.

According to the processing which stores the cache line in the address array and the data array, the cache unit (not shown, for example, refer to FIG. 12) notifies the flush control apparatus 51 according to this exemplary embodiment of the address 16 and the way information to store the cache line.

The update unit 52 receives the address 16 and the way information, and calculates a tag identifier based on a predetermined calculation method from the received address 16 (Step S61). Next, the update unit 52 decides whether or not a tag identifier exists which is the same with the tag identifier calculated in the tag memory unit 14 and tag information is valid (Step S62).

In case the tag memory unit 14 stores the valid tag identifier (decided YES in Step S62), the update unit 52, at the entry of the tag identifier in the line memory unit 15, as well as stores the received way information in a region which is associated with the cache line containing the received address, makes the line information which is associated with the cache line valid (Step S66).

In case the tag memory unit 14 does not store the valid tag identifier (decided NO in Step S62), the update unit 52 searches, in the tag memory unit 14, a tag identifier where the tag information is associated with being invalid (Step S63).

In case the tag identifier where the tag information is associated with being invalid does not exist in the tag memory unit 14, (decided NO in Step S63), the update unit 52 selects a tag identifier based on a predetermined selection method, and as well as directs the flush instruction 17 which flushes all of a plurality of cache lines which are associated with the tag possessing the selected tag identifier, invalidates all of the line information which is associated with each cache line to flush (Step S64).

For example, the predetermined selection method is, such as: a method to select at random or a method to select the tag identifier which is referred least. This exemplary embodiment is not limited to the predetermined selection methods exemplified.

After that, the update unit 52, in the tag memory unit 14 and in the area which stores the tag identifier associated with the cache lines flushed, as well as stores the calculated tag identifier of the tag, makes the tag information associated with the tag identifier valid (Step S65). As well, the update unit 52, as well as stores the received way information in a region which is associated with the cache line in accordance with the predetermined format, makes the line information associated with the cache line valid (Step S66).

In case the tag identifier where the tag information is associated with being invalid exists in the tag memory unit 14 (decided YES in Step S63), the update unit 52 performs the similar processing as the one after flush processing mentioned above in the area which stores the invalid tag information (Step S65 and Step S66).

Since the second exemplary embodiment contains the similar structures as the first exemplary embodiment, it is capable of controlling cache memory of Set Associative efficiently.

Further, according to the second exemplary embodiment, since the cache unit performs update in response to storing the cache line in the address array and the data array, it enables processing time to be reduced further.

Third Exemplary Embodiment

Next, a third exemplary embodiment on the basis of the first exemplary embodiment mentioned above will be explained.

In the following explanation, a characteristic part according to this exemplary embodiment will be explained mainly and similar structures as the first exemplary embodiment mentioned above are attached the identical reference numbers and overlapping explanation will be omitted.

Figure 7:
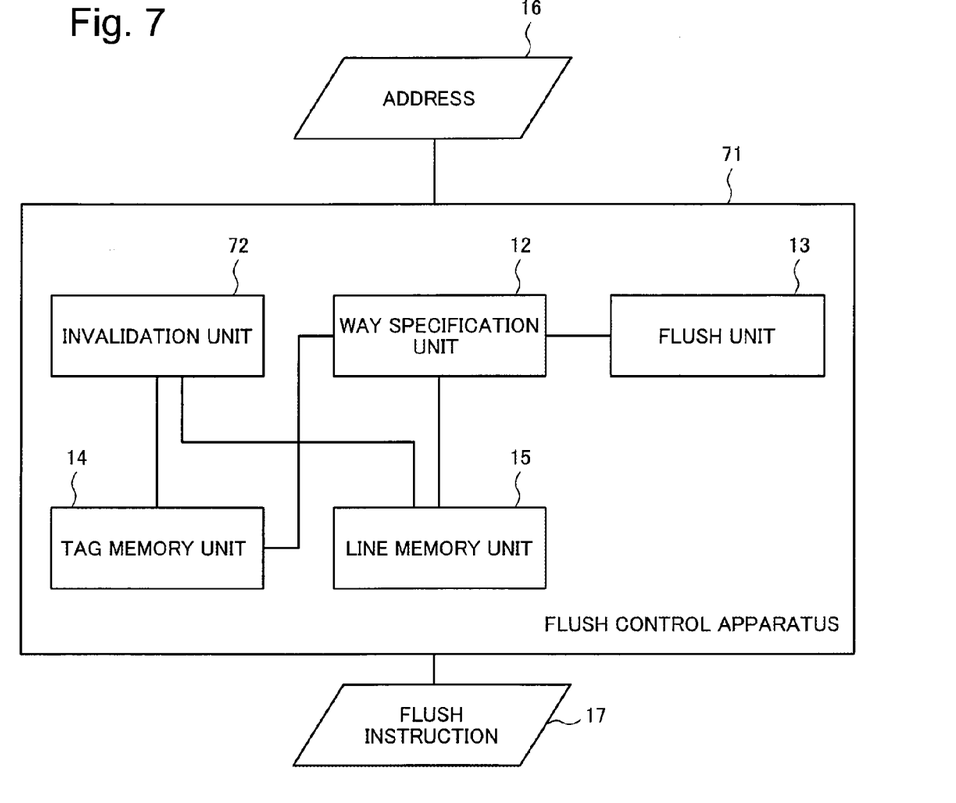
FIG. 7 is a block diagram showing a structure which a flush control apparatus according to a third exemplary embodiment of the present invention includes.
Figure 8:
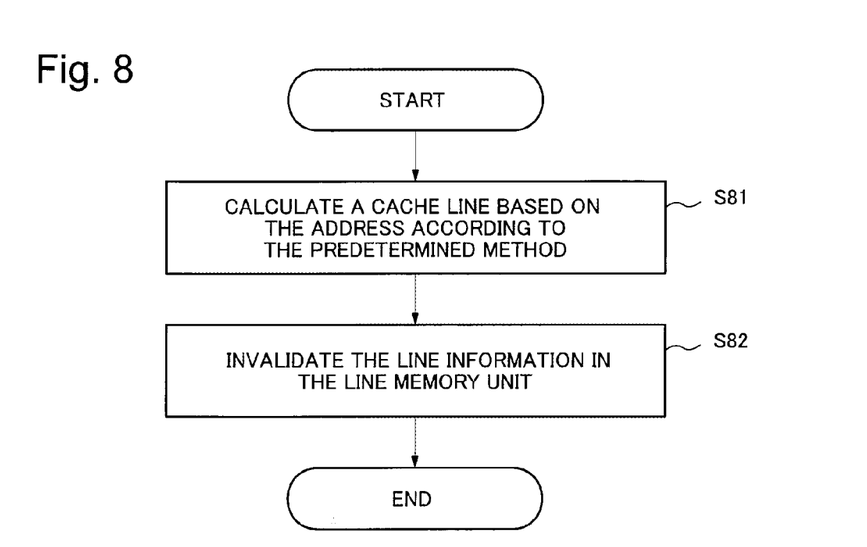
FIG. 8 is a flow chart showing a flow of processing in a flush control apparatus according to the third exemplary embodiment.

A structure which a flush control apparatus 71 according to the third exemplary embodiment of the present invention includes and processing which performed by the flush control apparatus 71 will be explained with reference to FIG. 7 and FIG. 8. FIG. 7 is a block diagram showing a structure which the flush control apparatus 71 according to the third exemplary embodiment of the present invention includes. FIG. 8 is a flow chart showing a flow of processing in the flush control apparatus 71 according to the third exemplary embodiment.

The flush control apparatus 71 according to this exemplary embodiment includes further, in addition to the first exemplary embodiment, an invalidation unit 72 which invalidates tag information in the tag memory unit 14.

In response to flushing the cache line from the address array and the data array, the cache unit (not shown, for example, refer to FIG. 12) notifies the flush control apparatus 71 according to this exemplary embodiment of the address 16 flushed and the way information.

The invalidation unit 72 receives the address 16 and the way information, and calculates a tag identifier based on a predetermined calculation method from the received address 16 (Step S81). Next, at an entry of the tag identifier in the line memory unit 15, the invalidation unit 72 invalidates the line information which is associated with the cache line containing the received address 16 (Step S82).

Since the third exemplary embodiment contains the similar structures as the first exemplary embodiment, it is capable of controlling cache memory of Set Associative efficiently.

Further, according to the third exemplary embodiment, since the cache unit performs update in response to flushing the cache line in the address array and the data array, it enables processing time to be reduced further.

Fourth Exemplary Embodiment

Next, a fourth exemplary embodiment on the basis of the first exemplary embodiment mentioned above will be explained.

In the following explanation, a characteristic part according to this exemplary embodiment will be explained mainly and, similar structures as the first exemplary embodiment mentioned above are attached the identical reference numbers and overlapping explanation will be omitted.

Figure 9:
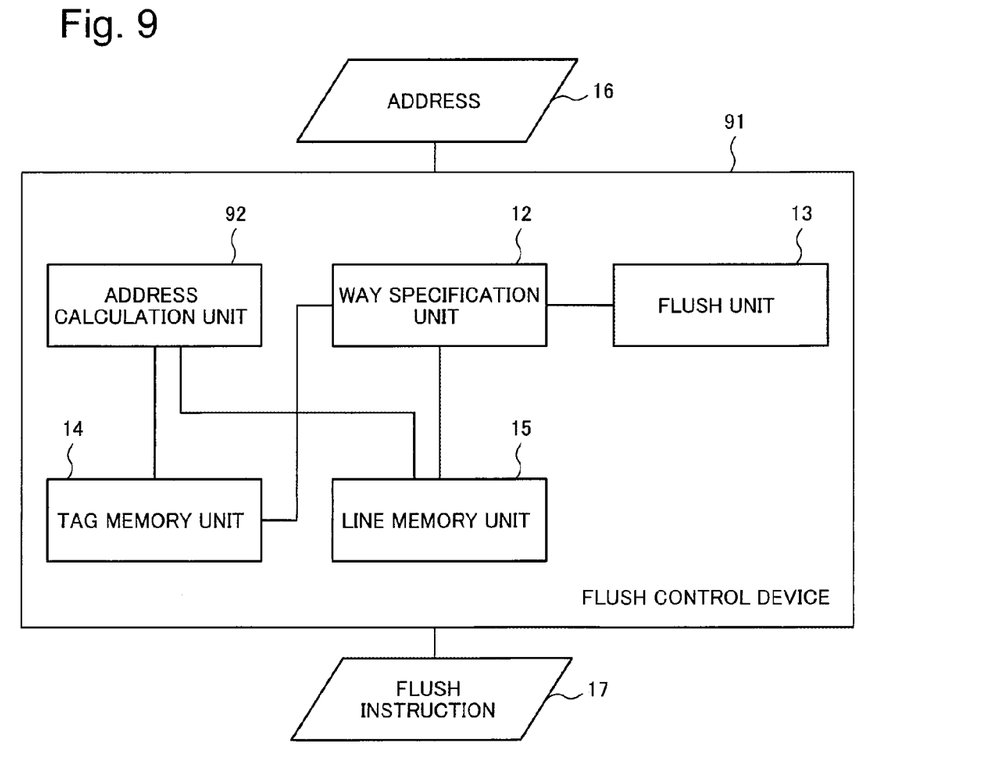
FIG. 9 is a block diagram showing a structure which a flush control apparatus according to a fourth exemplary embodiment of the present invention includes.
Figure 10:
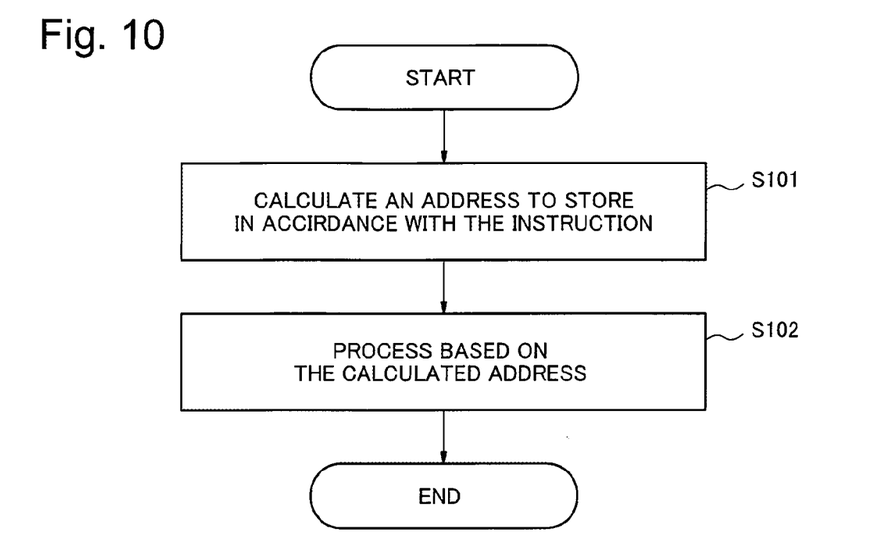
FIG. 10 is a flow chart showing a flow of processing in a flush control apparatus according to a fourth exemplary embodiment.

A structure which a flush control apparatus 91 according to the fourth exemplary embodiment of the present invention includes and processing performed by the flush control apparatus 91 will be explained with reference to FIG. 9 and FIG. 10. FIG. 9 is a block diagram showing a structure which the flush control apparatus 91 according to the fourth exemplary embodiment of the present invention includes. FIG. 10 is a flow chart showing a flow of processing in the flush control apparatus 91 according to the fourth exemplary embodiment.

The flush control apparatus 91 according to this exemplary embodiment includes further, in addition to the first exemplary embodiment, an address calculation unit 92 which calculates an address to store data in accordance with a vector store instruction.

In general, the vector store instruction refers to values about a base address which becomes a starting point of addresses to store data, distance which shows interval of the addresses, and vector length.

Here, suppose that the vector store instruction stores data with 8 byte length at each address which "Base", "Base+Dist", "Base+Dist×2", . . . , "Base+Dist×(VL−1)" ('×' shows multiplication.) indicate (provided that Base shows the base address, Dist shows the distance, and VL shows the vector length). Further it is assumed that the vector store instruction of which the base address is "48h000100000008", the distance is "48h000000000100", and VL is "3" is executed.

The address calculation unit 92 receives the vector store instruction and calculates an address to store data (Step S101). That is, the address calculation unit 92 calculates the address mentioned above on the basis of the base address, the distance and the vector length.

For example, the address calculation unit 92 calculates as the addresses to store data, "48h000100000008", "48h000100000108" and "48h000100000208". Next, the address calculation unit 92 sends the calculated addresses to the way specification unit 12.

The way specification unit 12 receives the addresses, and performs processing such as mentioned above (Step S102) based on the received addresses.

Since the fourth exemplary embodiment contains the similar structures as the first exemplary embodiment, it is capable of controlling cache memory of Set Associative efficiently.

Further, according to the fourth exemplary embodiment, since the address calculation unit 92 calculates the address to store data in accordance with the vector store instruction, the flush control apparatus 91 does not always need to receive all of the addresses to flush. As a result, it enables time for accessing each other to be reduced further.

Although the exemplary embodiments have been explained by the examples mentioned above, the exemplary embodiments are not limited to the examples mentioned above.

A part or all of each exemplary embodiment mentioned above can also be described as the following supplementary notes. However, the present invention which has been explained exemplarily by each exemplary embodiment mentioned above is not limited to the followings.

(Supplementary Note 1)

A flush control apparatus including:

a tag memory unit configured to store information which associates a tag identifier identifying a tag which associates a plurality of cache lines and tag information representing whether or not the tag is valid;

a line memory unit configured to store information which associates line information representing whether or not a first cache line in the plurality of cache lines associated with the tag is valid and a way information identifying a location storing the first cache line in accordance with a predetermined format;

a way specification unit configured to calculate a first tag identifier and a first address identifying the cache line including the address(es) respectively from one or more addresses for flushing and in accordance with a predetermined calculation method and search a specific tag identifier matching the first tag identifier in the tag memory unit, in case the specific tag identifier is found, read whether or not the tag information associated with the specific tag identifier indicates valid, in case the tag information stored in the tag memory unit indicates valid, read the line information associated with a plurality of second cache lines at an entry of the specific tag and the way information at an entry of the specific tag identifier respectively, and among the plurality of second cache lines, search a specific cache line, of which the line information indicates valid, contained in the first address, and send way information identifying the specific way storing the specific cache line; and a flush unit configured to receive the way information identifying the specific way and direct to flush the specific way among the ways storing the specific cache line.

(Supplementary Note 2)

The flush control apparatus described in supplementary note 1 further including:

an update unit configured to calculate the tag identifier based on the predetermined calculation method in response to storing the cache line and from the one or more addresses for flushing and determine whether or not a second tag identifier matching the calculated tag identifier and of which the tag information associated with the tag identifier indicating valid are stored in the tag memory unit;

in case the second tag identifier of which the tag information indicating valid is not found among the tag identifiers stored in the tag memory unit, select a specific tag identifier on the basis of a predetermined selection method, and in case the tag information associated with the specific tag identifier is valid, direct to flush the cache line associated with the tag possessing the specific tag identifier, invalidate the line information associated with the cache line to flush, and store information associating the calculated tag identifier and the tag information representing being valid at the entry storing the specific tag identifier in the tag memory unit, at the entry of the specific tag identifier in the line memory unit and store information associating the received way and a value of which the line information is valid in accordance with the predetermined format; and in case the second tag identifier of which the tag information is valid is found, store the received way in the way associated with the cache line containing the received address at the entry of the second tag identifier in the line memory unit and validate the line information associated with the cache line.

(Supplementary Note 3)

The flush control apparatus described in supplementary note 1 or supplementary note 2 further including: an invalidation unit configured to calculate, in response to flushing the cache line, a third tag identifier in accordance with the predetermined calculation method on the basis on the received address and invalidate the line information associated with the cache line at the entry of the third tag identifier in the line memory unit.

(Supplementary Note 4)

The flush control apparatus described in either one of supplementary note 1 to supplementary note 3 further including: an address calculation unit configured to calculate the address to store data in accordance with a vector store instruction, wherein the way specification unit sends the specific way based on the address which the address calculation unit calculates.

(Supplementary Note 5)

The flush control apparatus described in either one of supplementary note 1 to supplementary note 4, wherein the predetermined calculation method is processing which divides a value at the address into the tag, the cache line and the address in the cache line.

(Supplementary Note 6)

The flush control apparatus described in either one of supplementary note 1 to supplementary note 5, wherein the predetermined format is a format which arranges in ascending order of values of the address identifying the cache line.

(Supplementary Note 7)

The flush control apparatus described in either one of supplementary note 1 to supplementary note 6, wherein the predetermined format is a format representing the line information and the way as one value and arranges the value in ascending order of the values of the address identifying the cache line.

(Supplementary Note 8)

A cache memory apparatus possessing the flush control apparatus described in either one of supplementary note 1 to supplementary note 7.

(Supplementary Note 9)

A flush control method including: in a cache control apparatus comprising:

a tag memory unit storing information which associates a tag identifier identifying a tag which associates a plurality of cache lines and tag information representing whether or not the tag is valid; and a line memory unit storing information which associates line information representing whether or not a first cache line in the plurality of cache lines associated with the tag is valid and a way information identifying a location storing the first cache line in accordance with a predetermined format;

calculating a first tag identifier and a first address identifying the cache line including the address(es) respectively from one or more addresses for flushing and in accordance with a predetermined calculation method and searching a specific tag identifier matching the first tag identifier in the tag memory unit, in case the specific tag identifier is found, reading whether or not the tag information associated with the specific tag identifier indicates valid, in case the tag information stored in the tag memory unit indicates valid, reading the line information associated with a plurality of second cache lines at an entry of the specific tag and the way information at an entry of the specific tag identifier respectively, and among the plurality of second cache lines, searching a specific cache line, of which the line information indicates valid, contained in the first address, and send way information identifying the specific way storing the specific cache line, and receiving the way information identifying the specific way and direct to flush the specific way among the ways storing the specific cache line.

(Supplementary Note 10)

The flush control method described in supplementary note 9 including: calculating the tag identifier based on the predetermined calculation method in response to storing the cache line and from the one or more addresses for flushing and determining whether or not a second tag identifier matching the calculated tag identifier and of which the tag information associated with the tag identifier indicating valid are stored in the tag memory unit, exists, in case the second tag identifier of which the tag information indicating valid is not found among the tag identifiers stored in the tag memory unit, selecting a specific tag identifier on the basis of a predetermined selection method, and in case the tag information associated with the specific tag identifier is valid, directing to flush the cache line associated with the tag possessing the specific tag identifier, invalidate the line information associated with the cache line to flush, and storing information associating the calculated tag identifier and the tag information representing being valid at the entry storing the specific tag identifier in the tag memory unit, at the entry of the specific tag identifier in the line memory unit and store information associating the received way and a value of which the line information is valid in accordance with the predetermined format, and in case the second tag identifier of which the tag information is valid is found, store the received way in the way associated with the cache line containing the received address at the entry of the second tag identifier in the line memory unit and validate the line information associated with the cache line.

(Supplementary Note 11)

The flush control method described in supplementary note 9 or supplementary note 10 further including: calculating a third tag identifier in accordance with the predetermined calculation method in responding to flushing the cache line and from the received address, and invalidating the line information associated with the cache line at the entry of the third tag identifier in the line memory unit.

(Supplementary Note 12)

The flush control method described in either one of supplementary note 9 to supplementary note 11 further including: calculating the address to store data in accordance with a vector store instruction and sending the specific way on the basis of the address.

(Supplementary Note 13)

The flush control method described in either one of supplementary note 9 to supplementary note 12, wherein the predetermined calculation method is processing for dividing a value at the address into the tag, the cache line and the address in the cache line.

(Supplementary Note 14)

The flush control method described in either one of supplementary note 9 to supplementary note 13, wherein the predetermined format is a format which arranges in ascending order of values of the address identifying the cache line.

(Supplementary Note 15)

The flush control method described in either one of supplementary note 9 to supplementary note 14, wherein the predetermined format is a format representing the line information and the way as one value and arranges the value in ascending order of the values of the address identifying the cache line.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A flush control apparatus comprising:
a tag memory unit configured to store information which associates a tag identifier identifying a tag which associates a plurality of cache lines and tag information representing whether or not the tag is valid;
a line memory unit configured to store information which associates line information representing whether or not a first cache line in the plurality of cache lines associated with the tag is valid and a way information identifying a location storing the first cache line in accordance with a predetermined format;
a way specification unit configured to calculate a first tag identifier and a first address identifying the cache line including the address(es) respectively from one or more addresses for flushing and in accordance with a predetermined calculation method and search a specific tag identifier matching the first tag identifier in the tag memory unit,
in case the specific tag identifier is found, read whether or not the tag information associated with the specific tag identifier indicates valid,
in case the tag information stored in the tag memory unit indicates valid, read the line information associated with a plurality of second cache lines at an entry of the specific tag and the way information at an entry of the specific tag identifier respectively, and among the plurality of second cache lines, search a specific cache line, of which the line information indicates valid, contained in the first address, and send way information identifying the specific way storing the specific cache line; and
a flush unit configured to receive the way information identifying the specific way and directs to flush the specific way among the ways storing the specific cache line.

2. The flush control apparatus according to claim 1 further comprising:
an update unit configured to calculates the tag identifier based on the predetermined calculation method in response to storing the cache line and from the one or more addresses for flushing and determines, in the tag memory unit, whether or not a second tag identifier matching the calculated tag identifier and of which the tag information associated with the tag identifier indicating valid are stored in the tag memory unit;
in case the second tag identifier of which the tag information indicating valid is not found among the tag identifiers stored in the tag memory unit, select a specific tag identifier on the basis of a predetermined selection method, and in case the tag information associated with the specific tag identifier is valid, direction to flush the cache line associated with the tag possessing the specific tag identifier, invalidate the line information associated with the cache line to flush, and store information associating the calculated tag identifier and the tag information representing being valid at the entry storing the specific tag identifier in the tag memory unit, at the entry of the specific tag identifier in the line memory unit and store information, associating the received way and a value of which the line information is valid in accordance with the predetermined format; and
in case the second tag identifier of which the tag information is valid is found, stores the received way in the way associated with the cache line containing the received address at the entry of the second tag identifier in the line memory unit and validates the line information associated with the cache line.

3. The flush control apparatus according to claim 1 further comprising:
an invalidation unit configured to calculates, in response to flushing the cache line, a third tag identifier in accordance with the predetermined calculation method on the basis on the received address and invalidates the line information associated with the cache line at the entry of the third tag identifier in the line memory unit.

4. The flush control apparatus according to claim 1 further comprising:
an address calculation unit configured to calculates the address to store data in accordance with a vector store instruction, wherein
the way specification unit sends the specific way based on the address which the address calculation unit calculates.

5. The flush control apparatus according to claim 1, wherein the predetermined calculation method is processing which divides a value at the address into the tag, the cache line and the address in the cache line.

6. The flush control apparatus according to claim 1, wherein the predetermined format is a format which arranges in ascending order of values of the address identifying the cache line.

7. The flush control apparatus according to claim 1, wherein the predetermined format is a format representing the line information and the way as one value and arranges the value in ascending order of the values of the address identifying the cache line.

8. A cache memory apparatus comprising the flush control apparatus according to claim 1.

9. A flush control method comprising: in a cache control apparatus comprising:
- a tag memory unit storing information which associates a tag identifier identifying a tag which associates a plurality of cache lines and tag information representing whether or not the tag is valid; and
- a line memory unit storing information which associates line information representing whether or not a first cache line in the plurality of cache lines associated with the tag is valid and a way information identifying a location storing the first cache line in accordance with a predetermined format;
- calculating a first tag identifier and a first address identifying the cache line including the address(es) respectively from one or more addresses for flushing and in accordance with a predetermined calculation method and searching a specific tag identifier matching the first tag identifier in the tag memory unit,
- in case the specific tag identifier is found, reading whether or not the tag information associated with the specific tag identifier indicates valid,
- in case the tag information stored in the tag memory unit indicates valid, reading the line information associated with a plurality of second cache lines at an entry of the specific tag and the way information at an entry of the specific tag identifier respectively, and among the plurality of second cache lines, searching a specific cache line, of which the line information indicates valid, contained in the first address, and send way information identifying the specific way storing the specific cache line, and
- receiving the way information identifying the specific way and direct to flush the specific way among the ways storing the specific cache line.

10. The flush control method according to claim 9 comprising:
- calculating the tag identifier based on the predetermined calculation method in response to storing the cache line and from the one or more addresses for flushing and determining whether or not a second tag identifier matching the calculated tag identifier and of which the tag information associated with the tag identifier indicating valid are stored in the tag memory unit,
- in case the second tag identifier of which the tag information indicating valid is not found among the tag identifiers stored in the tag memory unit, selecting a specific tag identifier on the basis of a predetermined selection method, and in case the tag information associated with the specific tag identifier is valid, directing to flush the cache line associated with the tag possessing the specific tag identifier, invalidate the line information associated with the cache line to flush, and storing information associating the calculated tag identifier and the tag information representing being valid at the entry storing the specific tag identifier in the tag memory unit, at the entry of the specific tag identifier in the line memory unit and store information associating the received way and a value of which the line information is valid in accordance with the predetermined format, and
- in case the second tag identifier of which the tag information is valid is found, store the received way in the way associated with the cache line containing the received address at the entry of the second tag identifier in the line memory unit and validate the line information associated with the cache line.

* * * * *